United States Patent Office 2,698,758
Patented Jan. 4, 1955

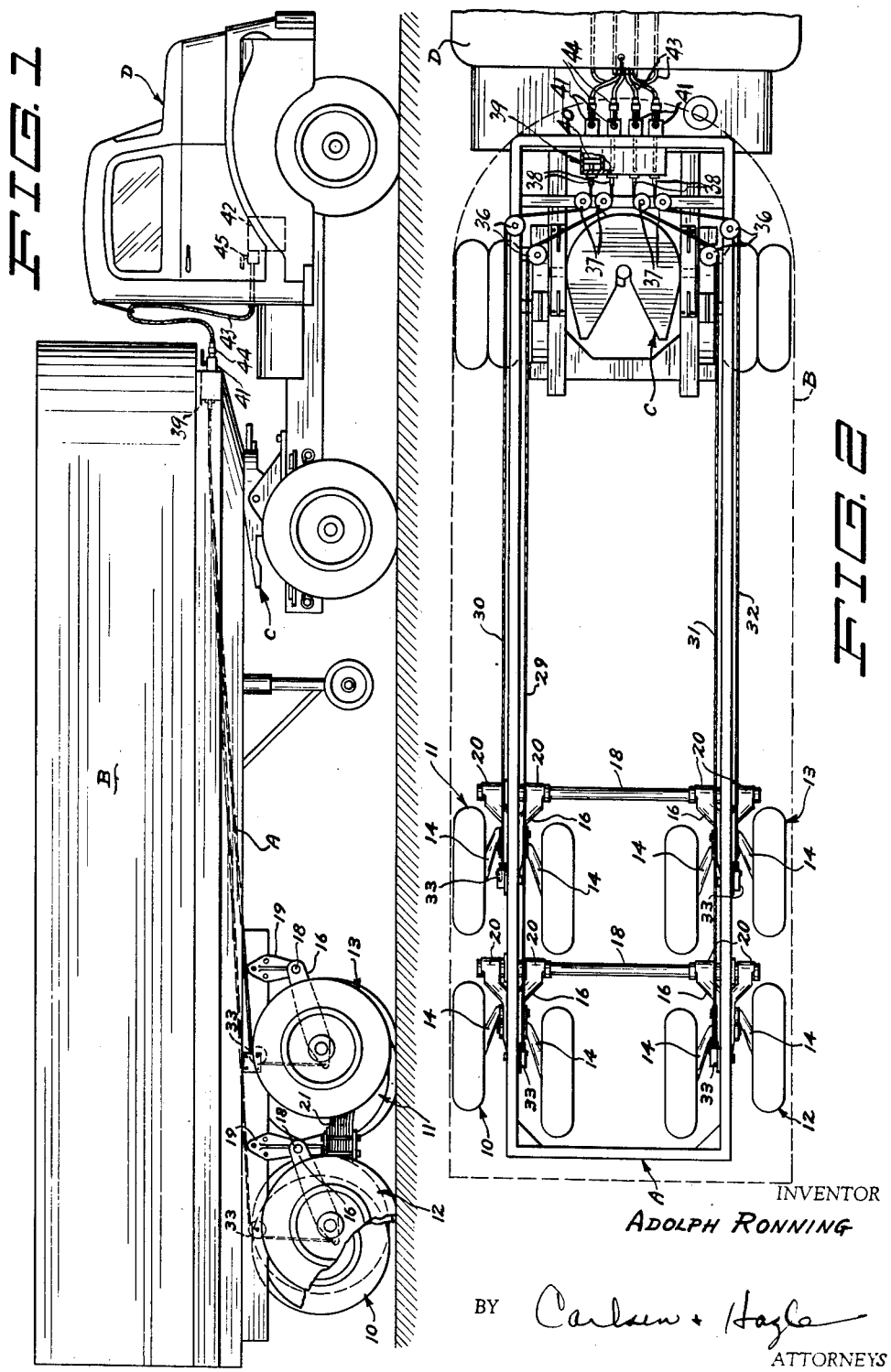

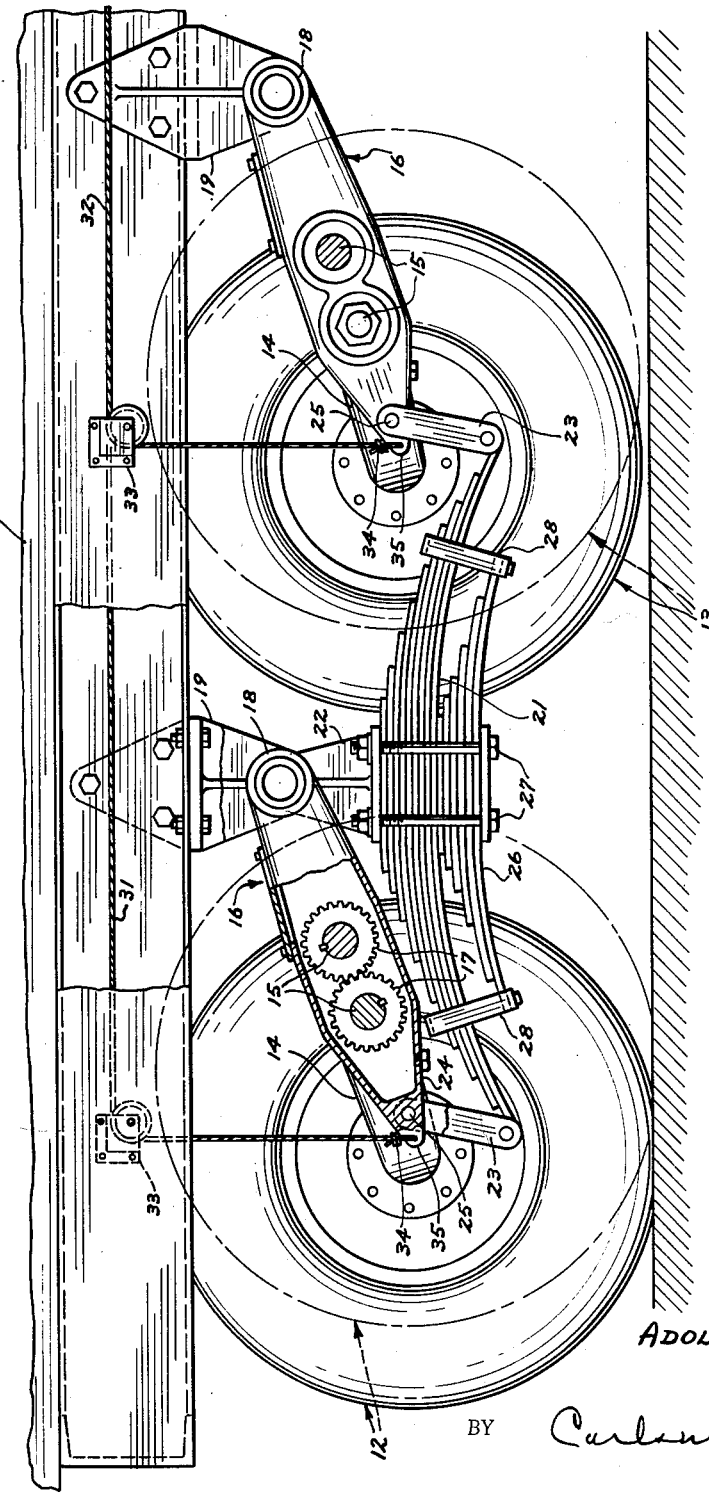

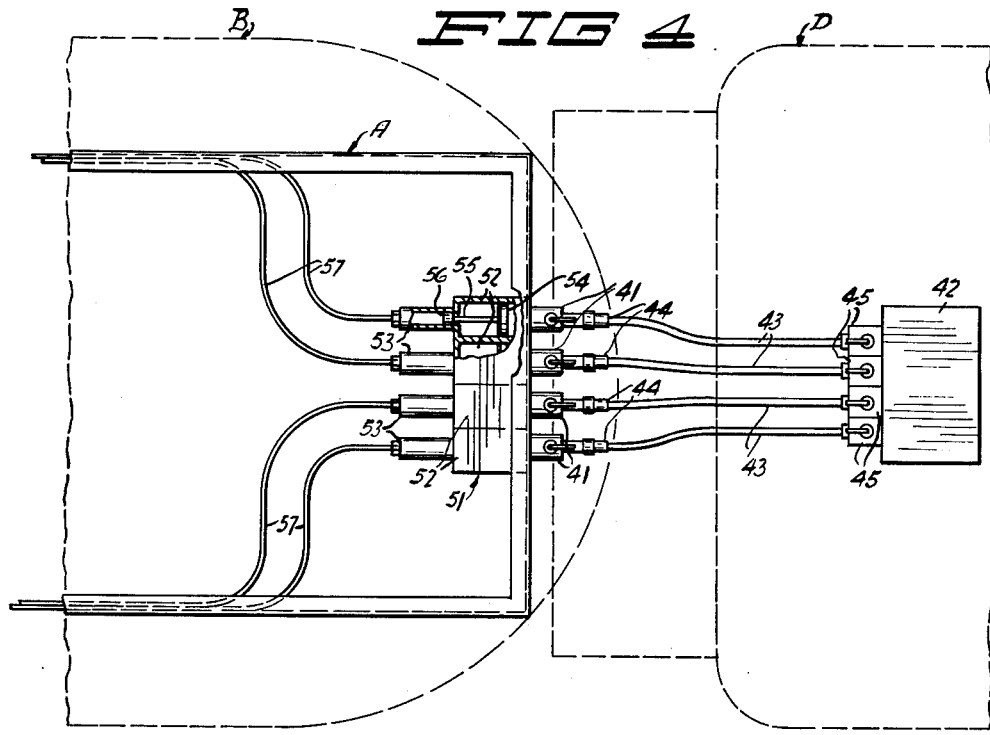
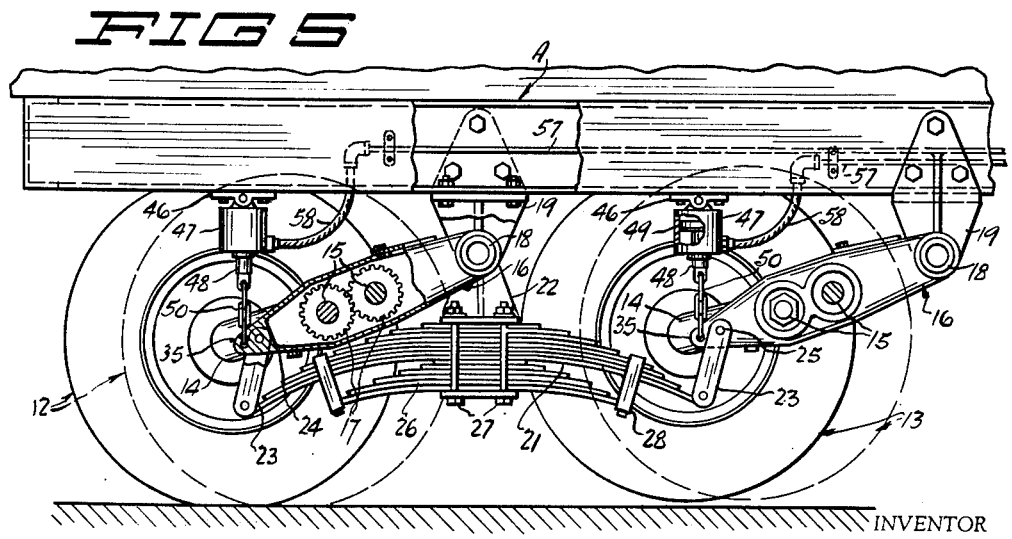

2,698,758

WHEEL LIFT FOR TANDEM WHEEL SUSPENSIONS

Adolph Ronning, Minneapolis, Minn.

Application May 2, 1951, Serial No. 224,148

7 Claims. (Cl. 280—104.5)

This invention relates generally to improvements in wheel suspensions for heavy-duty and high speed vehicles and more specifically to mechanism by means of which selected numbers of the wheels may be lifted out of road contact when desired.

In accordance with this invention I provide a tandem wheel suspension adapted for use by semi-trailers and other highway vehicles, and with a group of four wheel pairs or sets arranged in tandem, two at each side of the vehicle, and so connected to the vehicle that any one of the sets may move up and down individually. A vehicle suspension of this type is disclosed and claimed in my co-pending application Serial No. 601,030, filed June 22, 1945, now Patent No. 2,612,387, dated September 30, 1952, and the present application constitutes a continuation-in-part therefrom. In the operation of vehicles of this type it is sometimes very desirable to lift one or more of the wheel sets out of road surface engagement, as, for example, when a tire failure occurs or when it is desired to reduce the number of tires in contact with the road when the truck or vehicle is running empty or lightly loaded. It is the primary object of this invention to provide means by which any one of the wheel sets may be lifted to a position out of contact with the road and in which as many as two of such wheel sets may be lifted, except that, of course, both wheel sets at the same side of the vehicle cannot be raised. In other words, the front pair or rear pair of wheel sets may be raised, or either diagonally related pair, while leaving the remaining wheels in stable road bearing engagement with the surface.

A further object is to provide a wheel lift of this nature which is extremely simple and practical in construction and in installation upon the vehicle.

These and other more detailed and specific objects will be disclosed in the course of the following specification, reference being had to the accompanying drawings, in which—

Fig. 1 is a side elevation of a semi-trailer and towing tractor equipped with a wheel suspension and wheel lift according to my invention, showing the front wheel set upon the near side of the vehicle as elevated and the diagonally related rear wheel set upon the opposite side as lifted.

Fig. 2 is a top plan view, with the forepart of the tractor broken away and the trailer cab omitted but shown in outline in dotted lines.

Fig. 3 is an enlarged vertical, longitudinal and sectional view through the wheel suspension showing the lift means for the individual wheel sets and with certain portions broken away to disclose interior details of the construction.

Fig. 4 is a plan view of the forepart of a trailer frame, with the outline of the trailer and tractor in dotted lines, showing a modification of the operating means for lifting the wheels.

Fig. 5 is a view similar to Fig. 3 but on a smaller scale showing a modified wheel lift suitable for control by the structure shown in Fig. 4.

Referring now more particularly and by reference characters to the drawing, I have illustrated my invention as a part of the well known combination of a semi-trailer having a chassis A and cab B and supported at its forward end by a fifth wheel mechanism C upon a tractor D by which the combination is pulled over the highway. I do not, of course, limit myself to this specific use of the present invention. but the combination illustrated is one which is very widely used and well known. Also, as is well known to those skilled in the art, such equipment offers many problems in effective wheel suspensions, due to the heavy loads and high speeds employed, and such wheel suspensions must not only effectively support the load but also must be so arranged as to operate with a minimum damage to the highways. As set forth in my prior application previously identified, I provide a wheel suspension made up of four wheeled supports, wheel sets, or wheel pairs, which are here designated generally at 10, 11, 12 and 13. These wheel sets are arranged in tandem relation, at opposite sides of the center line of the vehicle, and each wheel set comprises a heavy-duty, pneumatic-tired wheel so that a total of eight tires are employed to carry the load. The individual wheels of each wheel set are differentially connected for opposite up and down movements, while the wheel sets at each side are also longitudinally connected for differential movements so as to evenly distribute the load and accommodate the vehicle to high speed operation over even quite irregular surfaces, all as pointed out in my previous application.

It is to be noted that there is no stiff axle cross connecting the wheel sets so that each of the four sets may move upward and downward individually and the wheel mounting by which this is made possible will be briefly described herein. Each wheel set is substantially identical with the other and only one will be described in detail with corresponding reference numerals used to designate the corresponding parts throughout. The individual wheels are transversely spaced and are journaled upon the rear ends of crank axles 14 which, at forward ends, are provided with pintles or journals 15, one located forward of the other and rotatably mounted in and through a differential connecting mechanism which includes a housing member, indicated generally at 16. Interiorly of this housing the pintles 15 are fitted with meshing gears 17 so that as either crank axle 14 moves upwardly, as its associated wheel travels over an irregularity in the road surface, the opposite axle will be moved downwardly a corresponding amount, and vice-versa. The resulting differential compensating action insures even load distribution between the wheels and minimum transmission of vertical deflection to the vehicle as either wheel meets an obstruction. As is best shown in Fig. 2 the crank axles 14 are of equal length and since their journals 15 are located one forwardly of the other the corresponding wheels are offset. As pointed out in my previous application this is very desirable due to the fact that all of the wheels will not contact expansion joints in the highway surface at one time, thus reducing the damage inflicted upon the road.

The housing member 16 extends forwardly from between the wheels and is journaled at its forward end upon a transversely extending cross tube 18 which is carried from the chassis A in brackets 19 secured thereto. As clearly shown, there is a pair of such cross tubes, one located forward of the other, in order to provide support for all four of the wheel sets, and for maximum strength and stability the housing members 16 are bifurcated at their forward ends providing widespread bearings 20 engaging the cross tubes.

An equalizing and spring suspension connection is arranged fore and aft between the wheel pairs at each side and is here shown as comprising a heavy cantilever leaf spring 21, which is secured at its center to a bracket 22 extending upwardly and pivotally mounted upon the rear cross tube 18 between the sleeves 20 of the adjacent housing member 16. Thus a supporting connection between the spring and the vehicle is formed at the center of the spring and the front and rear ends of the spring are connected by shackle links 23 to the rear extremities of the housing members 16 at each side. For this purpose these housing members have tapering rearward extensions 24, and cross pins 25 attach the upper ends of the shackle links. Further as here shown, the spring 21 is provided with a helper spring 26, held in place by the bolts 27 mounting the bracket 22, and with the ends loosely connected by shackle loops 28 to the front and rear ends of the main spring. It will now be apparent that the spring 21 will yieldably resist upward movements of the wheel sets at each side of the vehicle, thus not only providing spring suspension but also, due to the fact that the spring is intermediately rockably mounted upon the rear cross tube 18, causing a walking beam or equalizing action at each side of the vehicle. Thus there is a complete flexibility of movement, both between the individual wheels of each wheel set and between the respective wheel sets themselves, and the purpose and advantages of this mounting are clearly set forth in the parent application.

In the operation of equipment of this type it is advantageous in many instances to be able to lift a part of the wheels out of road surface contact while leaving the load stably supported upon the wheels remaining in such contact. For example, one or more tires may go bad under conditions making a tire change difficult or impossible, and it would be extremely desirable to lift the bad tire off the road to prevent damage. In some cases also the load bearing capacity of all four of the wheel sets is not required and unnecessary tire wear may be avoided by lifting a selected pair of such wheel sets off the road. I accordingly provide for each of the four wheel sets 10—13 separate lifting members which I here show, for example, as comprising four separate cables, designated at 29, 30, 31 and 32. Over each wheel set the chassis A is provided with a pulley, indicated throughout at 33, and the aforesaid cables 29—32 are secured at 34 to apertured lugs 35 on the rear extremities of the housing members 16 from which points the cables run upwardly and then forwardly over the pulleys 33. Thus it is at once apparent that a pull upon these cables will pull upward upon the rear ends of the housing members so as to swing them about the axes of the cross tube 18 and lift the associated wheels from the road. Since there are four of such cables, with one for each wheel set, it follows that any one of the wheel sets may be so lifted, or any selected pair of such wheel sets with the single exception that, of course, all of the wheels at one side of the vehicle will not be so raised for obvious reasons. A diagonally related pair of the wheel sets is shown raised in Fig. 1.

While the cables 29 through 32 may be operated in a number of ways I have illustrated in Figs. 1 and 2 mechanism for operating these cables pneumatically. Semi-trailer equipment of this nature is generally provided with a compressed air supply for braking and other purposes, and according to my invention I extend the cables forwardly around four pulleys 36 and inwardly and forwardly around a set of pulleys 37, from which the cables may be attached to a series of four plungers 38 projecting rearwardly from a bank of four air cylinders cast in one block and designated generally at 39. Within such cylinders the plungers 38 carry pistons 40, and while not clearly shown in the drawing the cylinder casting is so ported that air may be admitted under pressure to the cylinders, behind such pistons, in order to drive them forwardly and exert a pull upon any one of the cables as will be understood. Compressed air is selectively supplied to any one of the cylinders in the block 39 by means of a bank of control valves 41, conveniently located at the forward part of the trailer chassis A, and the necessary connections between these valves and the conventional air supply reservoir 42 in the tractor cab D are made through a series of flexible hoses 43 extending between the tractor and trailer in the usual fashion. The actual connection between the hoses and the valves is preferably made by means of quick-detachable couplings, designated throughout at 44, to facilitate the disconnection of the system when the tractor is disconnected from the trailer for other operations.

While in Fig. 1 only a single valve 45 is shown as connecting the hoses 44 to the reservoir 42, I prefer, as illustrated in Fig. 4, to provide a separate valve for each hose thus enabling the operator to control the lifting of the wheels either from within the cab, while the equipment is traveling, or from the front of the trailer itself, when the equipment is at a standstill. Assuming that it is desired to control the wheel lift from within the cab, the valves 41 will all be placed in the open position and the four valves 45 closed, so that by selectively opening the latter the wheels may be lifted either singly or in pairs as previously described. When it is desired to control the lifting action from the trailer, the valves will, of course, be reversely positioned, with all of the valves within the tractor cab open, to place the actual control at the valves 41 as will be readily understood.

Referring now to Fig. 5, I there disclose a modification of the invention wherein the cables 29 through 32 are omitted and in this view all parts corresponding to the showing in Fig. 3 are given the same reference characters for the sake of convenience. In accordance with this modification of my invention, I secure against the underside of the trailer frame A, above the rear extremities of each housing member 16, a bearing 46 from which is pivotally suspended a fluid motor having a cylinder 47 and a downwardly extending, slidable plunger 48, with a piston 49 within the cylinder. The lower extremity of the plunger 48 is then flexibly connected by means of a chain 50 to the lug 35 at the rear of the housing member 16 and it will be understood that the admission of fluid under pressure to the cylinder 47, below the piston 49, will force the same upward in order to lift the associated wheel set out of road surface contact. The flexibility afforded by the chains 50, on the other hand, will permit the necessary compensating motion of the wheel sets without interference from this cylinder connection thereto. In this case I prefer to operate the wheel lifting cylinders hydraulically rather than from the usual compressed air source on the tractor, and as seen in Fig. 4 I provide at the forward end of the frame A an air-to-fluid converter unit, designated generally at 51. This unit consists of a bank of four air cylinders 52 cast in a single block and with rearwardly directed fluid cylinders 53 of smaller diameter. In each air cylinder 52 there operates a large piston 54, connected by a piston rod 55 to a smaller piston 56 in the associated cylinder 53, and the rear end of the latter cylinder is then connected by a small diameter hydraulic line 57 to the corresponding cylinder 47 at the rear of the trailer. The necessary small swinging motions of the cylinders 47 about their pivot connections to the bearings 46, as the wheel sets move upwardly and downwardly, are provided for by means of flexible hoses 58 by which connection is made between the rear ends of the lines 57 and lower ends of the cylinders, as clearly shown in Fig. 5.

Here again the air admission to the cylinders 52 is selectively controlled by valves 41 at the front of the trailer frame, with the air supplied to such valves through flexible hoses 43 and quick-detachable couplings 44, as previously described. Also as shown in Fig. 4 and as previously referred to, the air supply to these four hoses 43, from the reservoir 42 within the tractor cab, is separately controlled by a series of four valves 45. The system, including the fluid cylinders 53, the lines 57, and the motor cylinders 47, is filled with hydraulic fluid and the arrangement is thus obviously such that the admission of air to the cylinders 52 will project the corresponding piston 54—56 rearwardly causing the fluid in the system to properly elevate the pistons 49 and swing the associated wheel sets up clear of the road surface. It is, of course, well known in the art that hydraulic systems of this nature are preferable where long supply lines are necessary, for various reasons, and the converter unit 51 takes care of the translation of air to fluid pressure necessary for the practical operation of the wheel lifting motors or cylinders.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. In a vehicle wheel suspension of the character described and for a vehicle traveling a road surface, front and rear wheel pairs at each side of the vehicle, members connected to the wheel pairs and swingably connected to the vehicle whereby the wheel pairs may individually move upward and downward, means yieldably resisting upward movement of the wheel pairs, and a separate upwardly and downwardly movable fluid pressure controlled lift means connected to each of said members for lifting the wheel pairs out of road surface engagement singly and in combinations of two front or two rear or either front or rear at one side with the rear and front respectively at the opposite side.

2. In a vehicle wheel suspension of the character described and for a vehicle traveling a road surface, front and rear wheel pairs at each side of the vehicle, members connected to the wheel pairs and swingably connected to the vehicle whereby the wheel pairs may individually move upward and downward, means yieldably resisting upward movement of the wheel pairs, and a separate lifting cable connected to each of said members and operative to pull upward thereon to lift the associated wheel pair out of road surface contact individually or in selected pairs.

3. In a vehicle wheel suspension of the character described and for a vehicle traveling a road surface, front and rear wheel pairs at each side of the vehicle, members connected to the wheel pairs and swingably connected to the vehicle whereby the wheel pairs may individually move upward and downward, means yieldably resisting upward movement of the wheel pairs, a separate lifting cable connected to each of said members and operative to pull upward thereon to lift the associated wheel pair out of road surface contact individually or in selected pairs, and fluid pressure operated cylinders having separate reciprocating plungers connected to said cables.

4. In a tractor-trailer vehicle, a wheel suspension for the trailer and having four sets of individually upwardly and downwardly movable wheels, a cable connected to each wheel set and extending upwardly and then forwardly therefrom, separate air cylinders having reciprocable plungers connected to the cables for pulling the cables and lifting the connected wheel sets out of road surface contact, an air supply system for the cylinders and including separate sets of valves on the trailer and on the tractor.

5. In a vehicle wheel suspension of the character described and for a vehicle traveling a road surface, front and rear wheel pairs at each side of the vehicle, members connected to the wheel pairs and swingably connected to the vehicle whereby the wheel pairs may individually move upward and downward, means yieldably resisting upward movement of the wheel pairs, a fluid motor for each wheel pair and each including a cylinder suspended from the vehicle above the said swingable member and having a downwardly directed reciprocable plunger flexibly connected to said member to raise the associated wheel pair out of road surface contact.

6. In a vehicle wheel suspension of the character described and for a vehicle traveling a road surface, front and rear wheel pairs at each side of the vehicle, members connected to the wheel pairs and swingably connected to the vehicle whereby the wheel pairs may individually move upward and downward, means yieldably resisting upward movement of the wheel pairs, a separate wheel lift means connected to each of said members for lifting the wheel pairs out of road surface contact, said lift means consisting of a fluid motor arranged adjacent each wheel pair, separate fluid supply lines extending to said fluid motors, and means at the forepart of the vehicle for supplying fluid and controlling fluid flow to the fluid motors.

7. In a wheel suspension for the frame of a trailer type vehicle of the character described, the combination comprising four wheels arranged with two in tandem at each side of the frame, means swingably connecting the wheels and frame whereby any of the wheels may swing upward out of road surface contact and spring means connected between the frame and wheels for distributing the load to the wheels in road surface contact, and separate individually actuatable means connected between the frame and the respective wheels for forcibly lifting any one of the wheels out of road surface contact and for similarly lifting any two of the wheels which will not destroy lateral stability of the vehicle whereby damaged wheels may be lifted to inoperative position and wheels not needed under light load conditions may be rendered inoperative.

References Cited in the file of this patent

UNITED STATES PATENTS

| Number | Name | Date |
|---|---|---|
| 318,865 | Burgess | May 26, 1885 |
| 1,857,249 | Marcum | May 10, 1932 |
| 1,981,593 | Fageol | Nov. 20, 1934 |
| 2,411,885 | Larison | Dec. 3, 1946 |
| 2,478,653 | Callan | Aug. 9, 1949 |